(12) United States Patent
Ensslin

(10) Patent No.: US 11,608,159 B2
(45) Date of Patent: Mar. 21, 2023

(54) SCISSORING PROPELLER WITH CENTRIPETALLY ACTUATED CENTERING LEVER LOCK

(71) Applicant: Aurora Flight Sciences Corporation, a subsidiary of The Boeing Company, Manassas, VA (US)

(72) Inventor: Oliver Daniel Ensslin, Lucerne (CH)

(73) Assignee: THE BOEING COMPANY, Chicago, IL (US)

(*) Notice: Subject to any disclaimer, the term of this patent is extended or adjusted under 35 U.S.C. 154(b) by 255 days.

(21) Appl. No.: 16/843,498

(22) Filed: Apr. 8, 2020

(65) Prior Publication Data

US 2021/0316851 A1  Oct. 14, 2021

(51) Int. Cl.
*B64C 11/28* (2006.01)
*B64C 29/00* (2006.01)

(52) U.S. Cl.
CPC .......... *B64C 11/28* (2013.01); *B64C 29/0025* (2013.01)

(58) Field of Classification Search
CPC ...... B64C 29/0025; B64C 27/50; B64C 11/28
See application file for complete search history.

(56) References Cited

U.S. PATENT DOCUMENTS

| 10,059,440 B2 | 8/2018 | Erdozain et al. | |
| 10,494,088 B1 * | 12/2019 | Coralie | B64C 11/28 |
| 2017/0166302 A1 * | 6/2017 | Shiosaki | B64C 29/0025 |
| 2019/0382106 A1 * | 12/2019 | Prager | B64C 11/28 |
| 2019/0382110 A1 | 12/2019 | Cottrell | |

* cited by examiner

*Primary Examiner* — Richard A Edgar
(74) *Attorney, Agent, or Firm* — Gates & Cooper LLP

(57) ABSTRACT

A propeller assembly including a shaft having a rotational axis; a plurality of propellers connected to the shaft; means for deploying the plurality of propellers using a centrifugal force generated from a rotation of the shaft, so as to provide vertical thrust during a vertical take-off and landing of the aircraft; and means for restoring the propellers into a stowed configuration.

20 Claims, 16 Drawing Sheets

SCISSORING PROPELLER WITH CENTRIPETALLY ACTUATED CENTERING LEVER LOCK

BACKGROUND

1. Field

The present disclosure relates to propeller assemblies, aircraft including the same, and associated methods.

2. Description of the Related Art

Aircraft such as rotorcraft utilize propellers to generate a vertical thrust for lifting the aircraft. In some such examples, the propellers are utilized primarily during take-off and landing of the aircraft (and/or for other altitude adjustments), and the aircraft further includes a forward thrust generator for propelling the aircraft forward. However, the propellers generating the vertical thrust also output considerable noise when operating at high revolutions per minute. In such examples, it is desirable to configure the propellers for maximum vertical thrust production at low rotational velocities and with reduced noise, which may be accomplished by increasing the number of propellers and/or the number of propeller blades of each propeller. However, in such examples, it also is desirable to configure the propellers to generate a low drag force when not in use, such as when the aircraft is propelled forward through air. The present disclosure satisfies this need.

SUMMARY

Propeller assemblies, aircraft including the same, and associated methods are disclosed herein.

Illustrative, non-exclusive examples of inventive subject matter according to the present disclosure are described in the following enumerated paragraphs:

A1. A propeller assembly, comprising:
a shaft having a rotational axis;
a first propeller coaxially connected to the shaft;
a second propeller;
a bearing rotatably and coaxially connecting the second propeller to the shaft;
a mechanism comprising a mass connected to the first propeller and the second propeller, the mechanism configured to deploy the second propeller away from a stowed configuration in response to a centrifugal force acting on the mass and generated by a rotation of the shaft about the rotational axis; and
at least one spring connecting the mechanism to the first propeller or the second propeller, the spring having a bias force configured to bias the second propeller in the stowed configuration.

A2. The propeller assembly of paragraph A1, wherein:
the first propeller comprises a first hub coaxially connected to the shaft;
the second propeller comprises a second hub and the bearing rotatably and coaxially connects the second hub to the shaft,
the mechanism comprises a connector assembly connecting the mass to the first hub and pivotally connecting the mass to the second hub, so as to pivot the second hub about the rotational axis and deploy the second propeller in response to the centrifugal force.

A3. The propeller assembly of paragraph A2, wherein the mass comprises a first mass and a second mass and the mechanism comprises a connector assembly including:
a first lever connecting the first mass to a first position on the first hub and a second lever connecting the second mass to a second position on the first hub, the second position diametrically opposed to the first position;
a third lever connected at a third position on the second hub and the third lever pivotably connected to the first lever, so that a first motion of the first mass in response to the centrifugal force causes the first lever to move the third lever and the second hub; and
a fourth lever connected at a fourth position on the second hub diametrically opposed to the third position and the fourth lever pivotably connected to the second lever, so that a second motion of the second mass in response to the centrifugal force causes the second lever to move the fourth lever and the second hub, in coordination with the first motion, to deploy the second propeller.

A4. The propeller assembly of paragraph A3, wherein:
the third lever is pivotally connected to the first lever at a fifth position between the first hub and the first mass, and
the fourth lever is pivotally connected to the second lever at a sixth position between the first hub and the second mass.

A5. The propeller assembly of paragraph A3, wherein the at least one spring comprises a first spring connecting the first lever to the first propeller and a second spring connecting the second lever to the first propeller.

A6. The propeller assembly of paragraph A1, wherein the second propeller is deployed in response to the centrifugal force overcoming the bias force.

A7. An aircraft comprising the propeller assembly of paragraph A1, further comprising:
a fuselage;
the propeller assembly operatively connected to the fuselage;
a motor connected to the shaft to rotate the shaft; and
a computer coupled to the motor, wherein the computer is configurable to command the motor to:
rotate the shaft with an angular velocity generating the centrifugal force deploying the second propeller into a deployed configuration, so that the propeller assembly generates a thrust during a vertical flight of the aircraft, and
decrease the angular velocity so that the centrifugal force is reduced below the bias force so that the second propeller returns to the stowed configuration when the aircraft is cruising or moving in a forward direction.

A8. The aircraft of paragraph A7, wherein:
the first propeller comprises first propeller blades having a first longitudinal axis and the second propeller comprises second propeller blades having a second longitudinal axis, and
the first longitudinal axis and the second longitudinal axis in the stowed configuration are substantially aligned along a forward direction so as to reduce a drag of the first propeller and the second propeller when the aircraft is moving in the forward direction.

A9. The aircraft of paragraph A7, further comprising an additional propulsor operationally connected to the fuselage for providing the aircraft with the thrust comprising forward thrust.

A10. A method of controlling a propeller assembly, comprising:
controlling a propeller assembly comprising:
a shaft having a rotational axis;
a first propeller coaxially connected to the shaft;
a second propeller;

a bearing rotatably and coaxially connecting the second propeller to the shaft;

a mechanism comprising a mass connected to the first propeller and the second propeller, the mechanism configured to deploy the second propeller away from a stowed configuration in response to a centrifugal force acting on the mass and generated by a rotation of the shaft about the rotational axis; and at least one spring connecting the mechanism to the first propeller, the spring having a bias force configured to bias the second propeller in the stowed configuration; and deploying the second propeller away from the stowed configuration, comprising rotating the shaft at an angular velocity to generate the centrifugal force that exceeds the bias force.

A11. The method of paragraph A10, wherein the angular velocity is more than 1000 revolutions per minute.

A12. The method of paragraph A10, wherein:

the first propeller comprises a first hub coaxially connected to the shaft;

the second propeller comprises a second hub and the bearing rotatably and coaxially connects the second hub to the shaft, the mechanism comprises a connector assembly connecting the mass to the first hub and pivotally connecting the mass to the second hub, so as to pivot the second hub about the rotational axis and deploy the second propeller in response to the centrifugal force.

A13. The method of paragraph A12, wherein wherein the mass comprises a first mass and a second mass and the mechanism comprises a connector assembly including:

a first lever connecting the first mass to a first position on the first hub and a second lever connecting the second mass to a second position on the first hub, the second position diametrically opposed to the first position;

a third lever connected at a third position on the second hub and the third lever pivotably connected to the first lever, so that a first motion of the first mass in response to the centrifugal force causes the first lever to move the third lever and the second hub; and a fourth lever connected at a fourth position on the second hub diametrically opposed to the third position and the fourth lever pivotably connected to the second lever, so that a second motion of the second mass in response to the centrifugal force causes the second lever to move the fourth lever and the second hub, in coordination with the first motion, to deploy the second propeller.

A14. The method of paragraph A13, wherein:

the third lever is pivotally connected to the first lever at a fifth position between the first hub and the first mass, and the fourth lever is pivotally connected to the second lever at a sixth position between the first hub and the second mass.

A15. The method of paragraph A14, wherein the at least one spring comprises a first spring connecting the first lever to the first propeller and a second spring connecting the second lever to the first propeller.

A16. The method of paragraph A10, wherein the first propeller comprises first propeller blades having a first longitudinal axis and the second propeller comprises second propeller blades having a second longitudinal axis, and the first longitudinal axis and the second longitudinal axis in the stowed configuration have are substantially aligned along the forward direction so as to reduce a drag of the first propeller and the second propeller when the aircraft is moving in the forward direction.

A17. The method of paragraph A11, further comprising retracting the second propeller into the stowed configuration, comprising reducing the angular velocity so that the bias force exceeds the centrifugal force.

A18. The method of paragraph A17, wherein:

the first propeller comprises first propeller blades having a first longitudinal axis and the second propeller comprises second propeller blades having a second longitudinal axis, and the retracting comprises stopping the rotating so that the bias force biases the second propeller in the stowed configuration including the first longitudinal axis and the second longitudinal axis substantially aligned along a forward direction so as to reduce a drag of the first propeller and the second propeller when the aircraft is moving in the forward direction.

A19. An aircraft comprising a propeller assembly, the propeller assembly comprising:

a shaft having a rotational axis;

a plurality of propellers connected to the shaft;

means for deploying the plurality of propellers using a centrifugal force generated from a rotation of the shaft, so as to provide vertical thrust during a vertical take-off and landing of the aircraft; and means for restoring the propellers into a stowed configuration when the centrifugal force is below a threshold level.

A20. The propeller assembly of paragraph A19, wherein the means for deploying comprises a plurality of levers connecting a mass to the propellers and the means for restoring comprises a spring connecting the mass to one of the propellers.

BRIEF DESCRIPTION OF THE DRAWINGS

FIG. 1A-1G illustrate a propeller assembly according to a first example, wherein FIG. 1A is a top view of the propeller assembly in a stowed configuration, FIG. 1B is a top view of the propeller assembly in transition between the stowed configuration and a deployed configuration, FIG. 1C is a top view of the propeller assembly in the stowed configuration, FIG. 1D is a close up perspective view of the propeller assembly in the deployed configuration, FIG. 1E is a perspective view of the propeller assembly in the stowed configuration, FIG. 1F is a perspective view of the propeller assembly in transition, and FIG. 1G is a perspective view of the propeller assembly in the deployed configuration showing the extent of the propeller blades.

FIG. 1H and FIG. 1I illustrate a propeller assembly according to a second example, wherein FIG. 1H illustrates the propeller assembly in a stowed configuration and FIG. 1I illustrates the propeller assembly in the deployed configuration.

DESCRIPTION

Figure 1A:
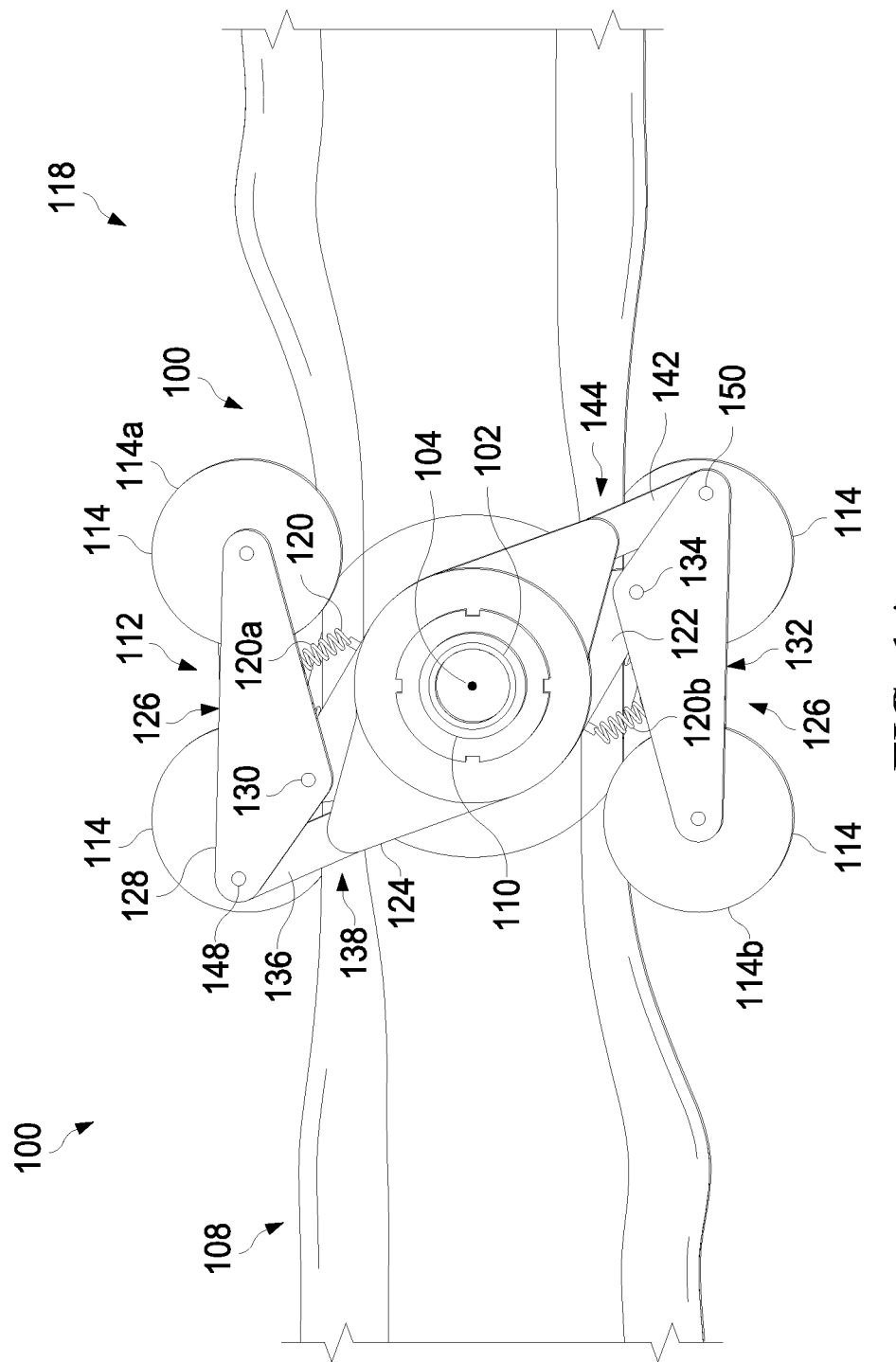

In the following description, reference is made to the accompanying drawings which form a part hereof, and which is shown, by way of illustration, several examples. It is understood that other examples may be utilized and structural changes may be made without departing from the scope of the present disclosure.

Technical Description

FIGS. 1A-1I, 2A, 2B, 3A, and 3B provide illustrative, non-exclusive examples of propeller assemblies 100, of aircraft incorporating propeller assemblies, and/or of methods of operating propeller assemblies, according to the present disclosure. In propeller-driven aircraft (such as rotorcraft), it is generally desirable that each propeller generate a high amount of thrust (e.g., a vertical thrust) at a low rotational velocity, such as to minimize a noise level produced by the propeller. Accordingly, many aircraft utilize propellers that include a plurality of propeller blades that spin at least substantially in unison to generate increased thrust at a given rotational velocity relative to propellers with fewer propeller blades. In some circumstances, however, such multi-bladed propellers may generate an undesirable drag force, such as when the propellers are selectively disabled from producing vertical thrust and the aircraft moves in a forward (e.g., horizontal) direction under the power of a separate thrust source. Accordingly, and as described herein, the present disclosure is directed to propeller assemblies that include a plurality of stacked propellers that are configured to transition between a thrust-generating mode of operation and a low-drag mode of operation.

As used herein, two or more components may be described as being coupled or connected to one another. The desired definition is that element A coupled to/connected to B is defined as either A directly or indirectly connected to B, including coupled or connected through one or more intervening elements.

Example Propeller Assemblies and Deployment

FIG. 1A-1I illustrate example propeller assemblies 100, comprising a shaft 102 having a rotational axis 104; a first propeller 106 coaxially connected to the shaft 102; a second propeller 108; a bearing 110 rotatably and coaxially connecting the second propeller 108 to the shaft 102; and a mechanism 112 comprising a mass 114 connected to the first propeller 106 and the second propeller 108. The mechanism 112 is configured to deploy 116 the second propeller 108 away from the stowed configuration 118 (FIG. 1A, FIG. 1E) into the deployed configuration 116a (FIG. 1C, FIG. 1G) and in response to a centrifugal force 117 acting on the mass 114 and generated by a rotation 104a of the shaft 102 about the rotational axis 104. The propeller assembly 100 further comprises at least one spring 120 connecting the mechanism 112 to the first propeller 106 or the second propeller 108, the spring 120 having a bias force 119 configured to bias the second propeller 108 in the stowed configuration 118.

FIG. 1A-1G illustrate a propeller assembly according to a first example, wherein the first propeller 106 comprises a first hub 122 (or first propeller carrier) and first blades 123 extending from the first hub 122, and the second propeller 108 comprises a second hub 124 (or second propeller carrier) and second blades 125 extending from the second hub 124. The first hub 122 is coaxially attached and fixed to the shaft 102 so that the first hub 122 and the first propeller 106 rotates in unison with the shaft 102. The bearing 110 rotatably and coaxially connects the second hub 124 to the shaft 102 so that the second hub 124 and the second propeller can freely rotate about the rotational axis 104 independently from the first propeller 106. An example bearing 110 includes, but are not limited to, roller bearings including ball bearings or slide bearings with shaft nuts to control play.

While FIG. 1A-1G illustrate the mechanism 112 directly connected to the first hub 122 and the second hub 124, in other examples the mechanism 112 is directly connected to any part of the first propeller 106 or the second propeller 108. In other examples, the mechanism 112 is directly connected to the shaft 102 and thereby is connected to the first propeller 106 through the intervening shaft 102.

Example mechanisms 112 include, but are not limited to, a connector assembly 126 pivotally connecting the mass 114 to the first hub 122 and pivotally connecting the mass 114 to the second hub 124, so as to pivot the second hub 124 about the rotational axis 104 and deploy 116 the second propeller 108 in response to the centrifugal force.

Examples of connector assemblies 126 include, but are not limited to, various configurations or linkages comprising connectors, connecting pieces, connecting members, levers, or arms connecting the mass 114 to the first propeller 106 and the second propeller 108.

In FIGS. 1A-1G, the mass 114 comprises a first mass 114a and a second mass 114b and the connector assembly 126 comprises:

a first lever 128 connecting the first mass 114a to a first position 130 on the first hub 122;

a second lever 132 connecting the second mass 114b to a second position 134 on the first hub 122 so that the second position 134 is diametrically opposed to the first position 130;

a third lever 136 connected at a third position 138 on the second hub 124, wherein the third lever 136 is pivotably connected to the first lever 128 so that a first motion 140 of the first mass 114a in response to the centrifugal force 117 causes the first lever 128 to move the third lever 136 and the second hub 124; and a fourth lever 142 connected at a fourth position 144 on the second hub 124 diametrically opposed to the third position 138, wherein the fourth lever 142 is pivotably connected to the second lever 132 so that a second motion 146 of the second mass 114b in response to the centrifugal force 117 causes the second lever 132 to move the fourth lever 142 and the second hub 124, in coordination with the first motion 140, to deploy the second propeller.

As illustrated, the third lever 136 is pivotally connected to the first lever 128 at a fifth position 148 between the first hub 122 and the first mass 114a, and the fourth lever 142 is pivotally connected to the second lever 132 at a sixth position 150 between the first hub 122 and the second mass 114b. The at least one spring 120 comprises a first spring 120a connecting the first lever 128 to the first propeller 106 and a second spring 120b connecting the second lever 132 to the first propeller 106.

Figure 1B:
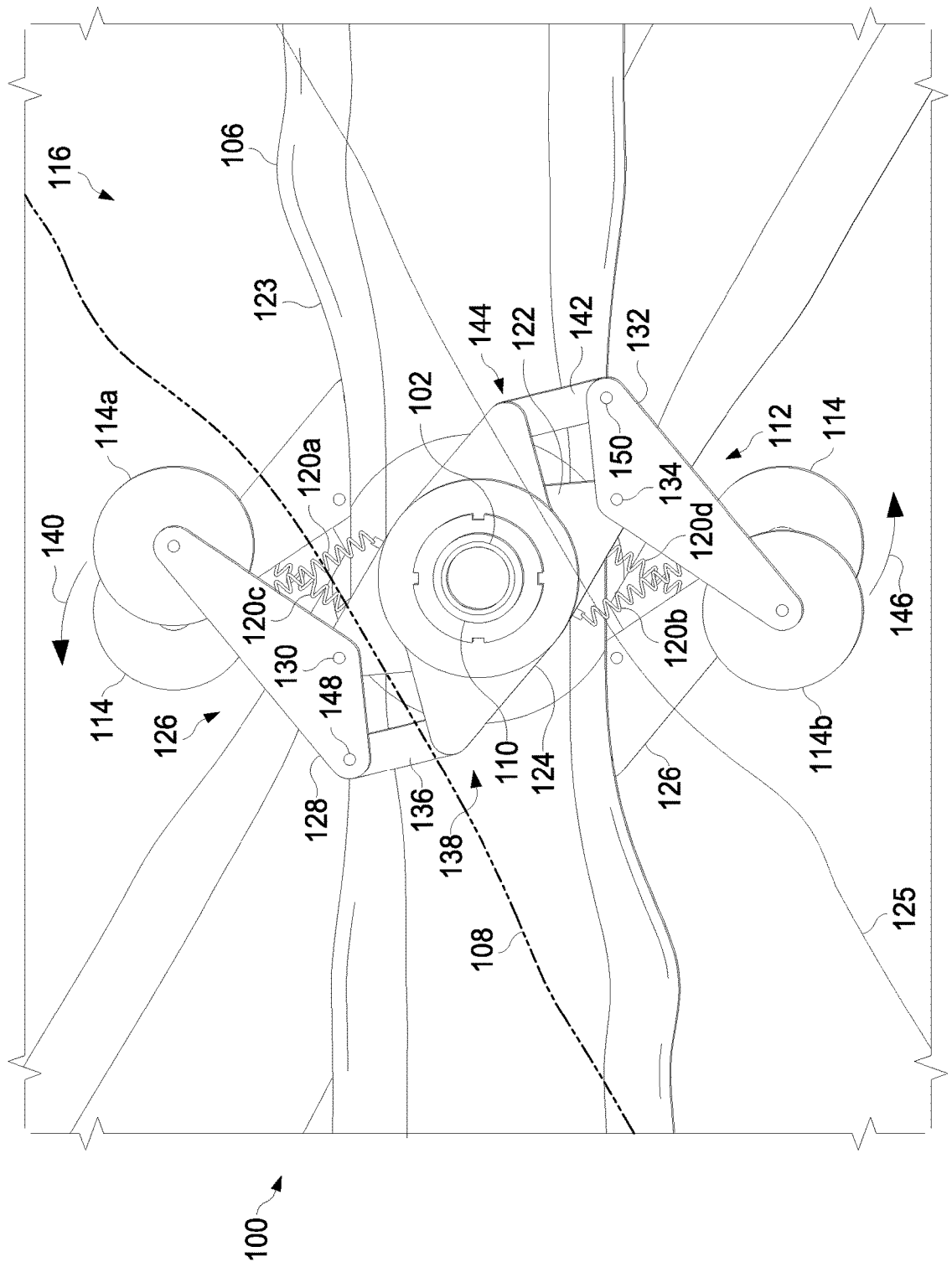
Figure 1C:
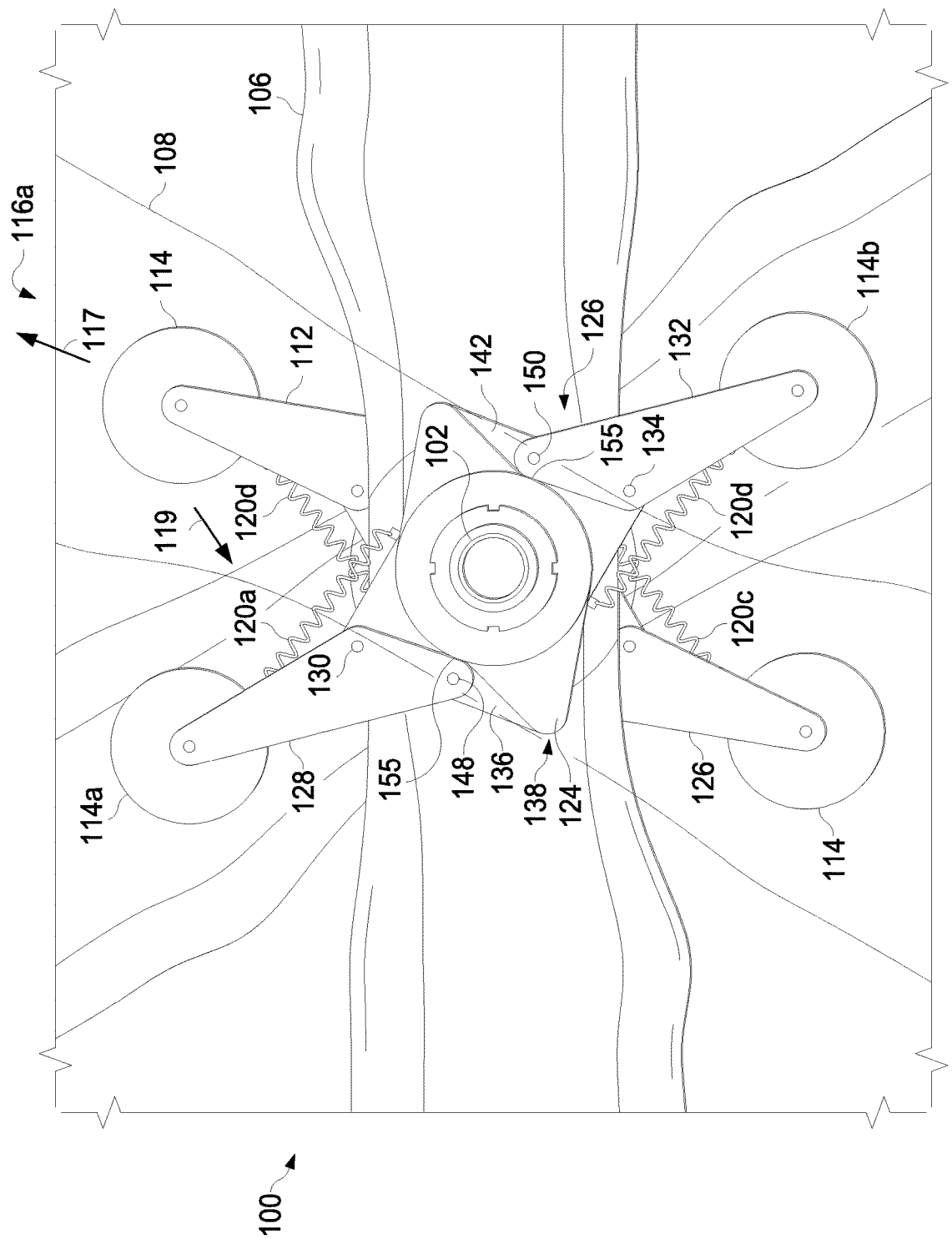
Figure 1D:
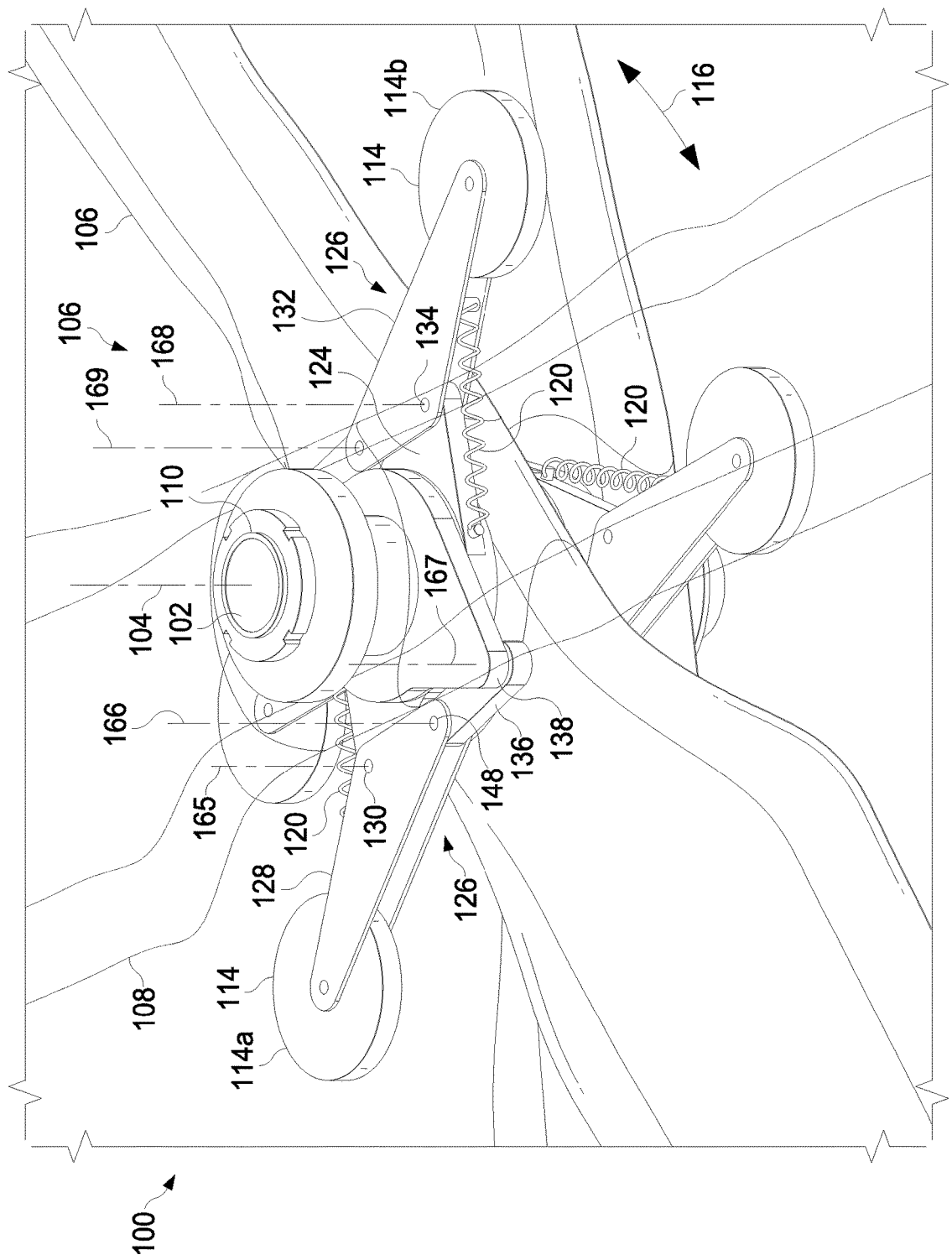
Figure 1E:
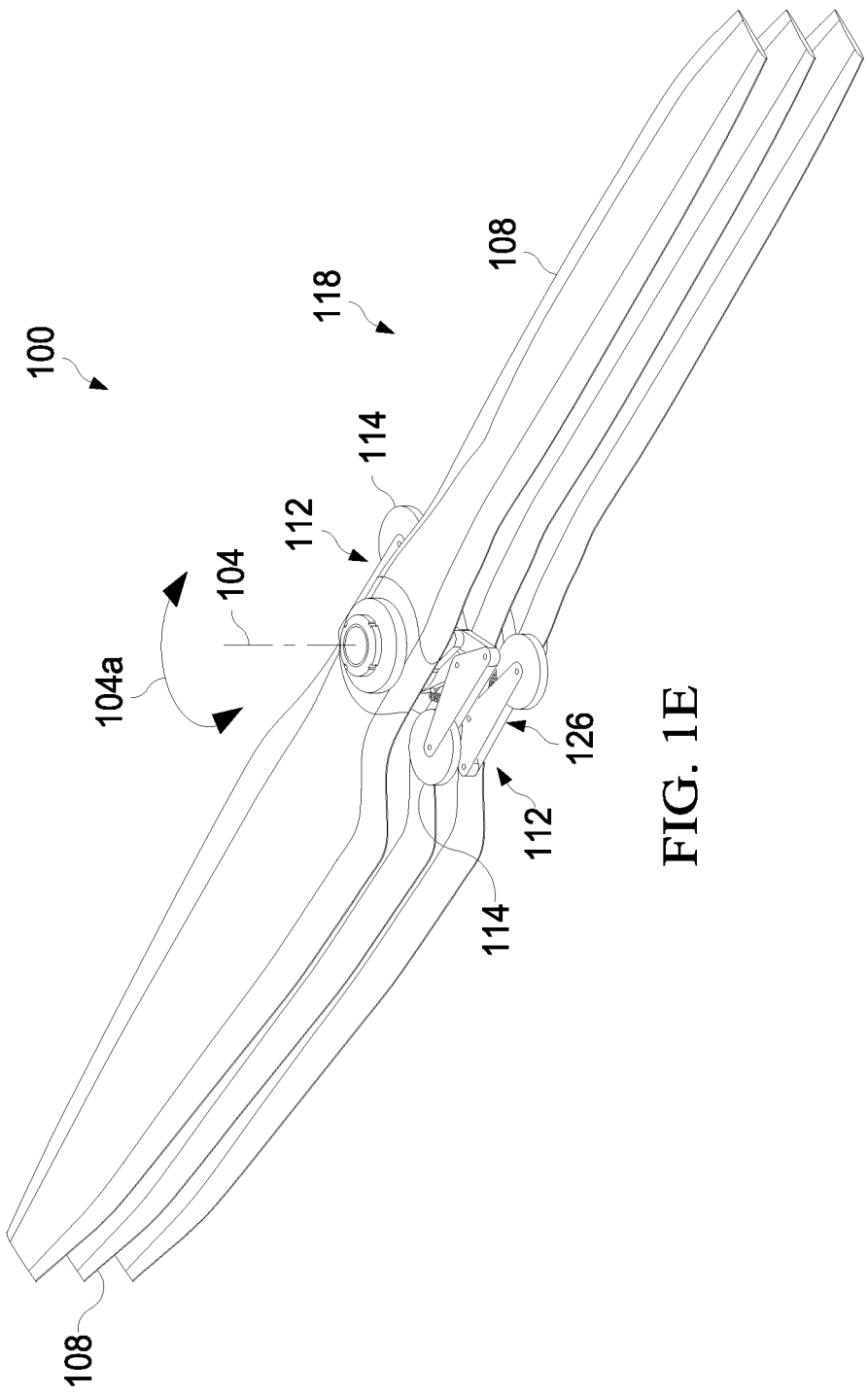
Figure 1F:
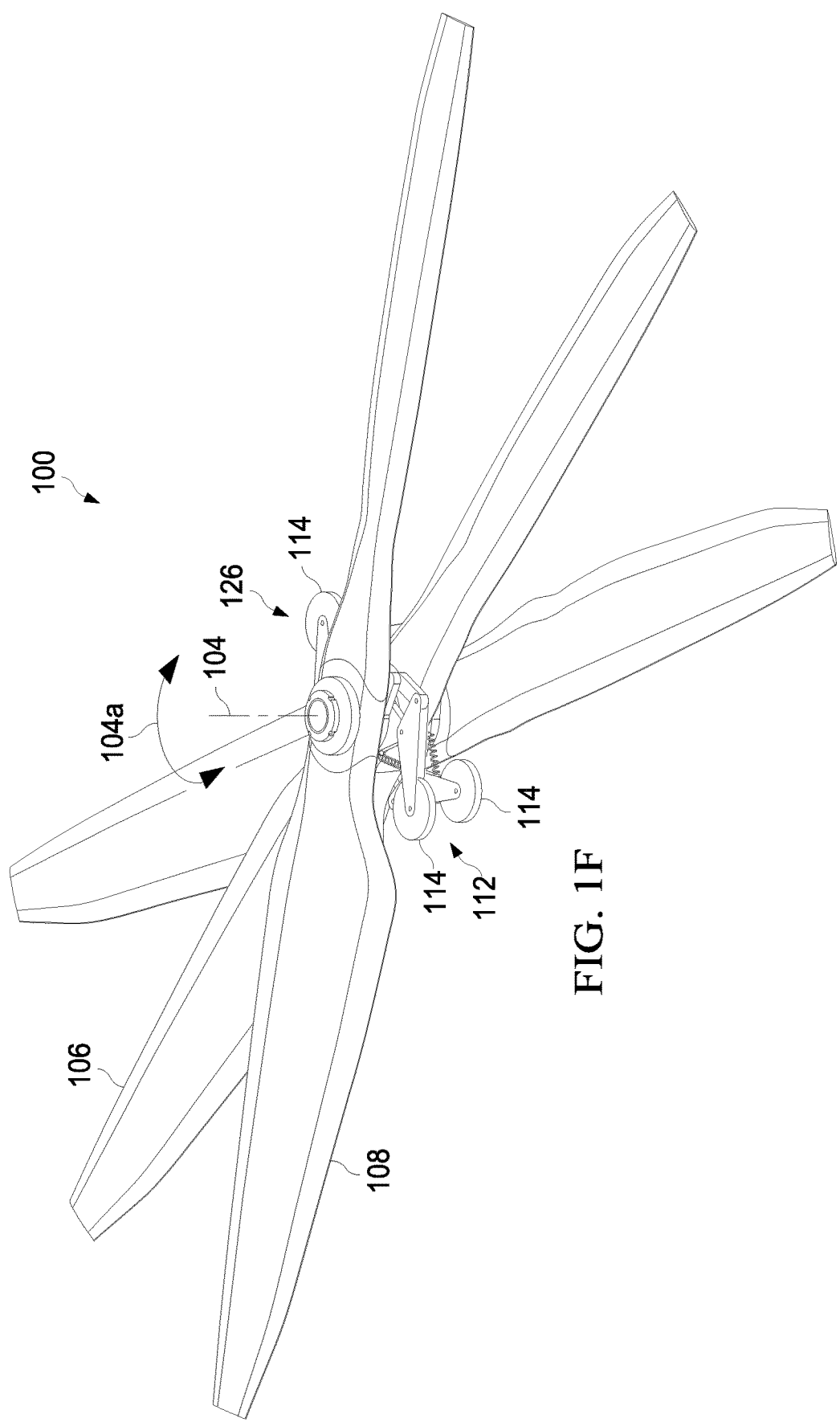
Figure 1G:
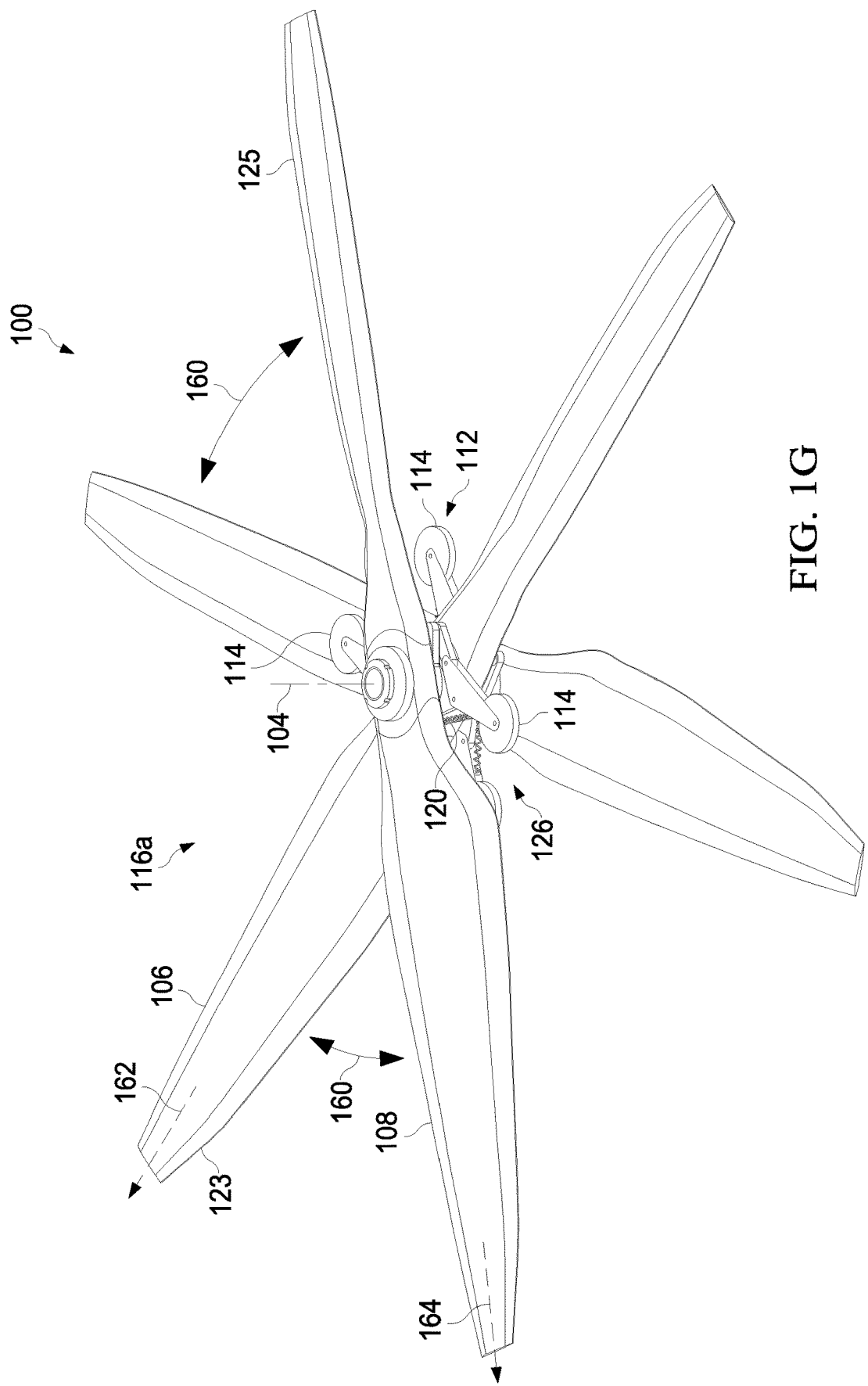

As illustrated in FIG. 1A-1G, the motion 140, 146 of the mass 114, in response to the centrifugal force 117, actuates the deployment of the second propeller 108, moving the second propeller 108 from a stowed configuration 118 (shown in FIG. 1A) to a transition configuration (FIG. 1B) and then to a deployed configuration 116a (shown in FIG. 1C). FIG. 1G shows the extent of deployment or deployment angle 160 between a first longitudinal axis 162 of the first blades 123 and a second longitudinal axis 164 of the second blades 125 (when the first longitudinal axis 162 and the second longitudinal axis 164 intersect at a vertex on the rotational axis 104), is determined or limited by the geometry of the levers 128, 132, 136, 142 (e.g., dimensions such as length), a stop mechanism (e.g., comprising the shaft 102, the first hub, 122 or the second hub 124), the weight of the mass 114, or the centrifugal force 117 itself. FIG. 1C illustrates the levers 128, 132, 136, 142 are connected and dimensioned so that a stop mechanism (in this case, physical contact 155 between the first lever 128 and the first hub 122 and physical contact between the second lever 132 and the first hub rigidly locks the levers 128, 132, 136, 142 when the first position 130, the third position 138, and the fifth position 148 are aligned, and the second position 134, the fourth position 144, and the sixth position 150 are aligned, thereby preventing any further movement of the second propeller 108 around the rotational axis 104 and rigidly fixing the propeller assembly 100 in the deployed configuration 118 having the deployment angle 160 (e.g., but not limited to, in a range of 30-80 degrees, e.g., 60 degrees). In the stowed configuration, as illustrated in FIG. 1A, the first longitudinal axis 162 and the second longitudinal axis 164 are substantially aligned (i.e., the deployment angle 160 is zero degrees or within 5 degrees).

As illustrated in FIG. 1D, the first lever 128 pivotally connecting the first mass 114a to a first position 130 on the first hub 122 comprises the first lever 128 pivoting with respect to the first hub 122 about a first pivot axis 165 passing through first position 130 of the joint connecting the first lever 128 to the first hub 122. The second lever 132 pivotally connecting the second mass 114b to a second position 134 on the first hub 122 comprises the second lever 132 pivoting with respect to the first hub 122 about a second pivot axis 168 passing through second position 134 at the joint connecting the second lever 132 to the first hub 122. The third lever 136 pivotally connected at a third position 138 on the second hub 124 comprises the third lever 136 pivoting with respect to the second hub 124 about a third pivot axis 167 passing through the third position 138 at the joint connecting the third lever 136 to the second hub 124. The third lever 136 pivotally connected to the first lever 128 comprises the third lever 136 being able to pivot with respect to the first lever 128 about a fourth pivot axis 166 passing through the fifth position 148 at the joint connecting the first lever 128 and the third lever 136. The fourth lever 142 pivotally connected at a fourth position 144 on the second hub 124 comprises the fourth lever 142 being able to pivot with respect to the second hub 124 about a fifth pivot axis passing through the fourth position 144 at the joint connecting the fourth lever 142 to the second hub 124. The fourth lever 142 pivotally connected to the second lever 132 comprises the fourth lever 142 being able to pivot about a sixth pivot axis 169 passing through sixth position 150 at the joint connecting the fourth lever 142 and the second lever 132.

Figure 1H:
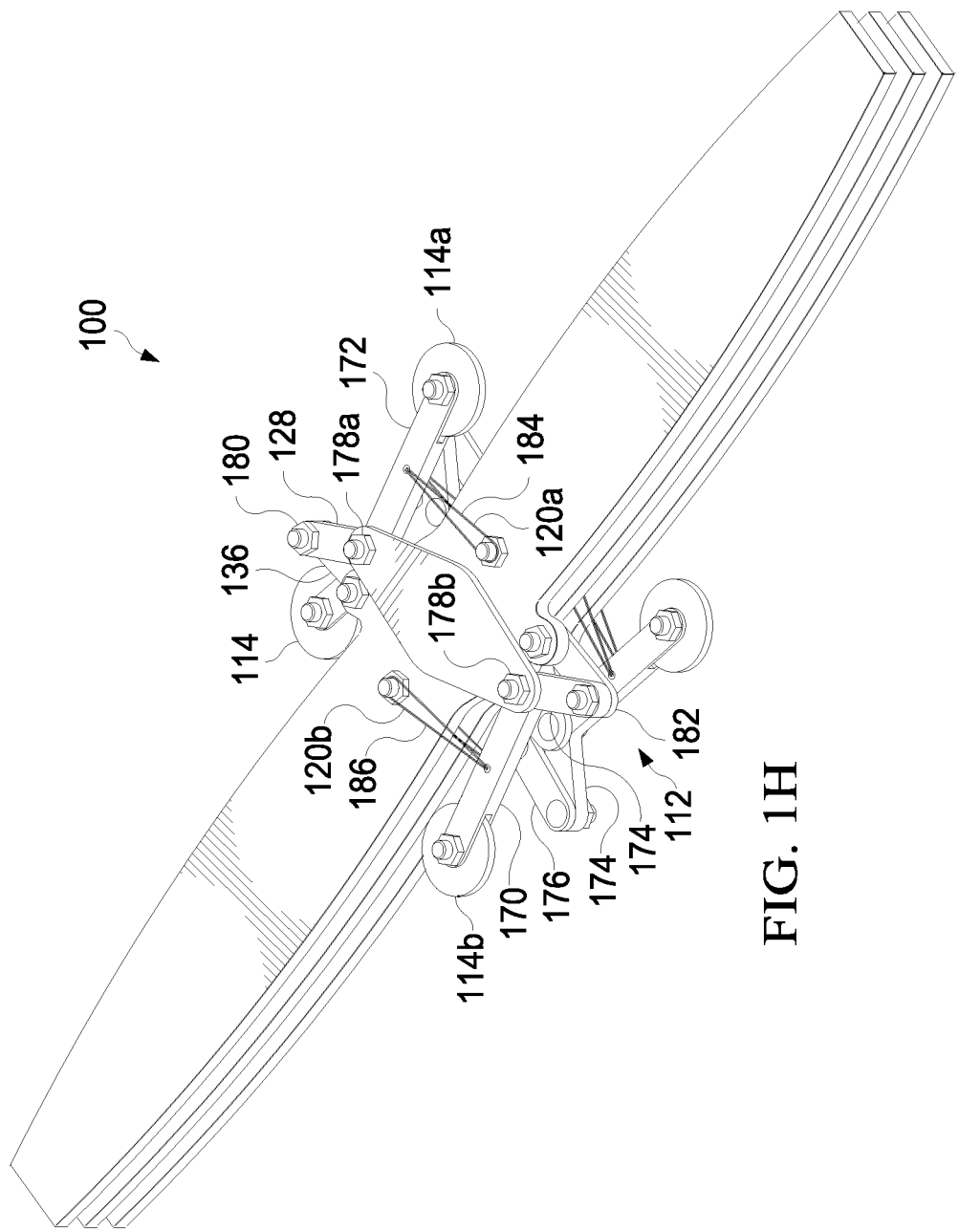
Figure 1I:
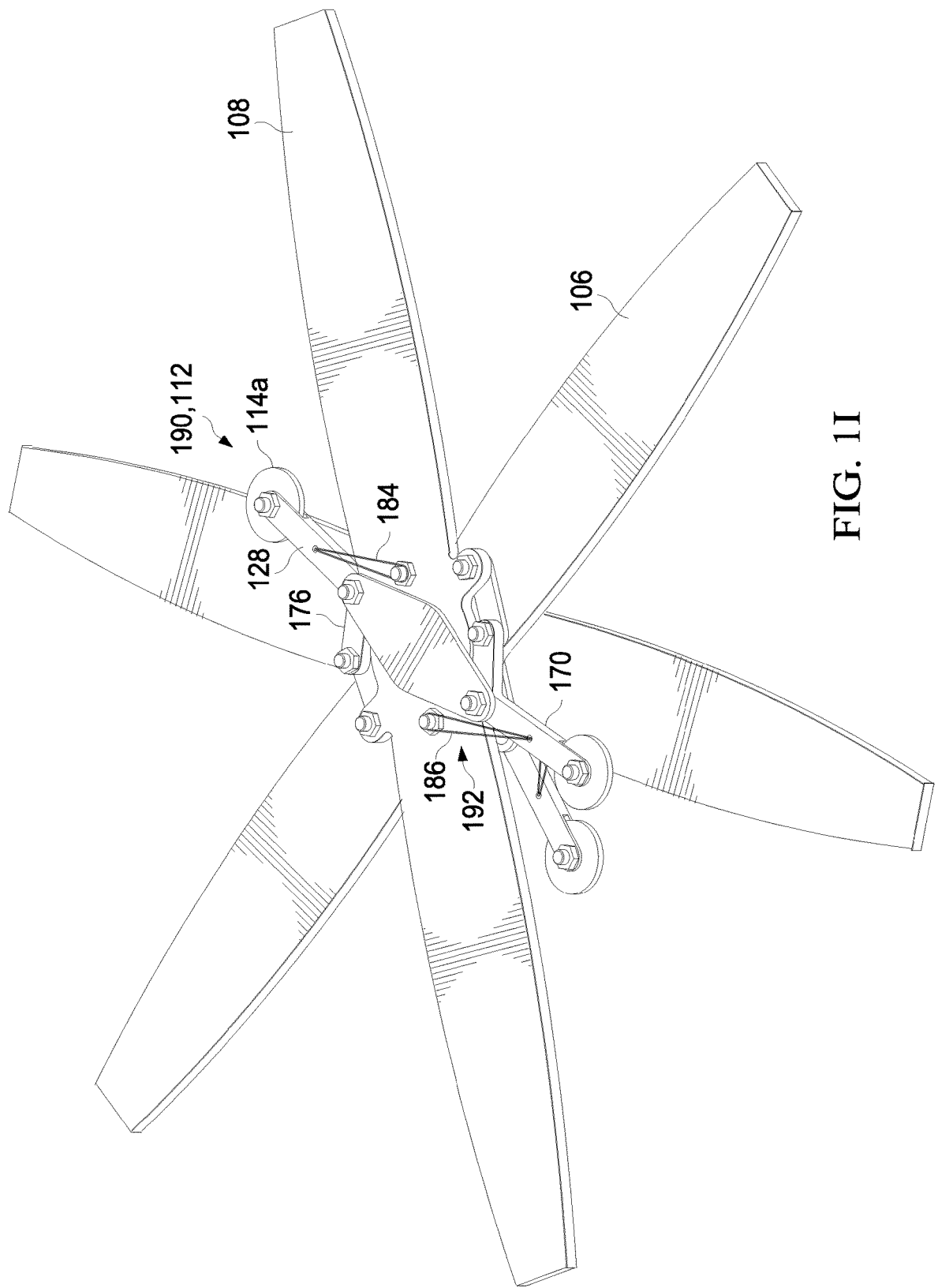

FIGS. 1H and 1I illustrate a propeller assembly 100 according to a second example. In this example, the first lever 128 and the second lever 132 each comprise a primary arm 170 including a first section 172 and a second section 174 at an angle with respect to the first section 172. The third lever 136 and the fourth lever 142 each comprise a secondary arm 176. The first section 172 of the first lever 128 pivotally connects the first mass 114a to the shaft 102 at a first joint 178a and the first section 172 of the second lever 132 pivotally connects the second mass 114b to the shaft 102 at a second joint 178b. The second section 174 of the first lever 128 pivotally connects to the secondary arm 176 of the third lever 136 at a third joint 180 and the second section 174 of the second lever 132 pivotally connects to the secondary arm 176 of the fourth lever 142 at a fourth joint 182. A first spring 120a comprising a first elastic material 184 connects the first section 172 of the first lever 128 to the second propeller 108 and a second spring 120b comprising a second elastic material 186 connects the first section 172 of the second lever 132 to the second propeller 108. The first spring 120a and the second spring 120b are connected to the second propeller 108 on diametrically opposite sides of the first hub 1224.

The levers 128, 132, 136, 142 or connector assembly 126 arrangements illustrated herein are merely provided as non-limiting examples of how parts are linked to actuate deployment of the second propellers 108 using a centrifugal force 117. Other designs consistent with the descriptions herein are also possible. For example, more generally, the present disclosure discloses a propeller assembly 100 comprising: a shaft 102 having a rotational axis; a plurality of propellers 106, 108 connected to the shaft 102; means for deploying 190 the plurality of propellers using a centrifugal force 117 generated from a rotation 104a of the shaft 102; and means for restoring 192 the propellers 106, 108 into a stowed configuration 118. Examples of the means for deploying 190 include the mechanism 112 and examples of the means for restoring 192 include the spring 120, as illustrated in FIG. 1I.

The propeller assembly 100 has been discussed in terms of the top two propellers in FIGS. 1A-1I. However, similar mechanisms 112 and springs are connected between the central propeller and the lowest (bottom propeller) in FIGS. 1A-1I to deploy all the propellers. For example, as illustrated in FIG. 1B, the at least one spring 120 further includes a third spring 120c and a fourth spring 120d connecting the first propeller 106 to the mechanism 112 between the lowest second propeller 108 and the first propeller 106, as discussed in the next section.

Example Propeller Assembly Configurations

A propeller assembly 100 according to examples described herein includes any number of propellers 106, 108 that can be stacked in a variety of configurations.

Figure 2A:
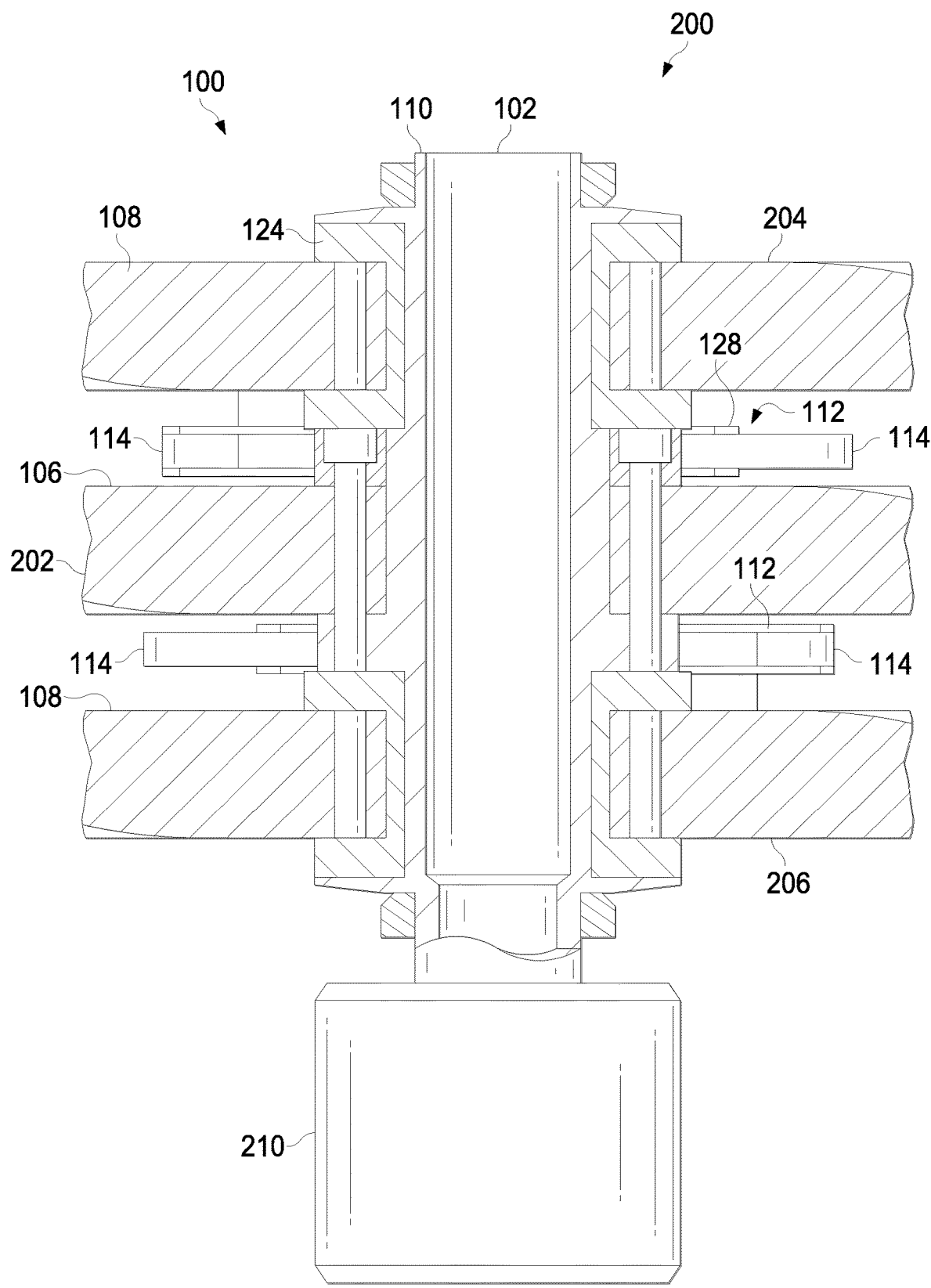
FIG. 2A is a cross sectional view of the propeller assembly according to the first example, comprising three propellers linked in parallel by a mechanism, wherein the first propeller fixed to the shaft is placed centrally between or in the middle of the two propellers connected to the shaft via a bearing so as to rotate freely about the rotational axis independently from the first propeller.

FIG. 2A illustrates an example propeller assembly 100, 200 including a stack of three propellers including the first propeller 106, comprising a central propeller 202, and a plurality of the second propellers 108, comprising a top propeller 204 and a bottom propeller 206. The central propeller 202 is fixed to the shaft 102, the top propeller 204 is mounted via a coaxial or axial bearing 110 to the shaft 102 at a location above the central propeller 202, and the bottom propeller 206 is mounted via a coaxial or axial bearing 110 to the shaft 102 at a location below the central propeller 202. As described herein, one of the mechanisms 112 connects the central propeller 202 to the top propeller 204 and another of the mechanisms 112 connects the central propeller 202 to the bottom propeller 206.

Figure 2B:
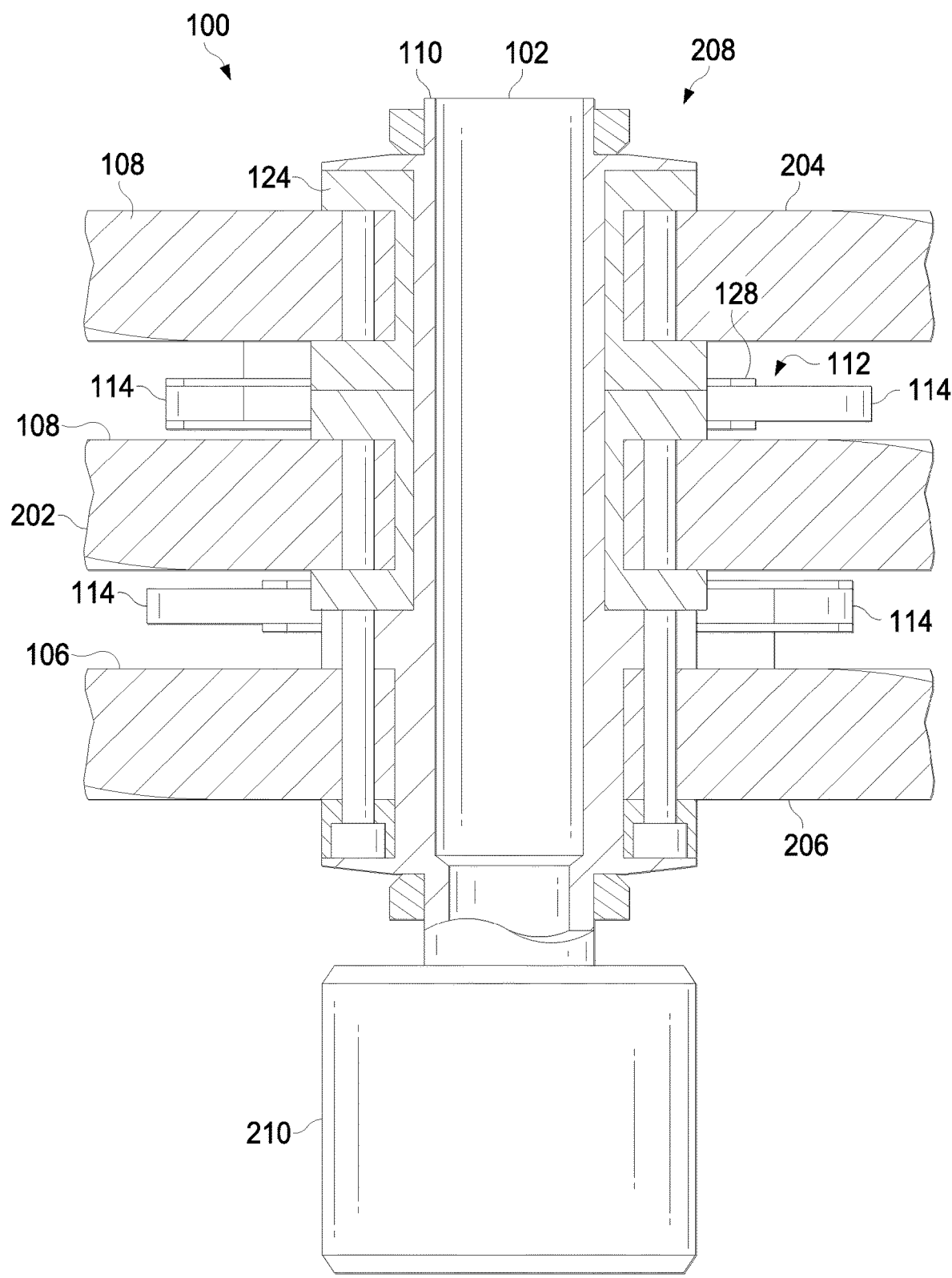
FIG. 2B is a cross sectional view of a propeller assembly comprising three propellers linked in series by a mechanism, wherein the first propeller fixed to the shaft is placed at a bottom of the stack.

FIG. 2B illustrates another example propeller assembly 208 wherein the first propeller 106 fixed to the shaft 102 is the bottom propeller 206 and the plurality of second propellers 108 comprise the central propeller 202 and top propeller 204. The central propeller 202 is mounted via coaxial or axial bearing 110 to the shaft 102 at a location above the bottom propeller 206 and the top propeller 204 is mounted via coaxial or axial bearing 110 to the shaft 102 a location above the central propeller 202. One of the mechanisms 112 connects the bottom propeller 206 to the central propeller 202 and another of the mechanisms 112 connects the central propeller 202 to the top propeller 204.

Although FIGS. 2A and 2B illustrate propeller assemblies including three propellers 202, 204, 206, the propeller assembly 100, 200, 208 may include any number of propellers comprising one or more first propellers 106 and one or more second propellers 108 as described herein. In one example, the first propeller 106 fixed to the shaft 102 is between second propellers 108 (a parallel connection). In the parallel connection illustrated in FIG. 2A, the first propeller 106 pulls or acts on each of the second propellers 108 (comprising top propeller 204 and bottom propeller 206) individually. In another example, the first propeller 106 fixed to the shaft 102 is below two adjacent second propellers 108 (a series connection). In the series connection illustrated in FIG. 2B, the first propeller 106 (bottom propeller 206) pulls or acts on the adjacent second propeller (in this case the central propeller 202) and the remaining second propeller 108 (in this case top propeller 204) follows the motion of the first propeller 106 though connection with the other second propeller 108 (central propeller 202). A mechanism 112 is between the first propeller 106 and the second propeller 108 and/or between two adjacent second propellers 108.

As illustrated herein, the propeller assembly 100 comprising multiple propellers (e.g., 3 two-bladed propellers) unfold at a variety of angles in between the individual blades. FIG. 1G shows the deployment angle 160 between a first longitudinal axis 162 of the first blades 123 of the first propeller 106 and a second longitudinal axis 164 of the second blades 125 of the second propellers 108. In the example of FIG. 2A, the second blades 125 of the second propellers 108 (the top propeller 204 and the bottom propeller 206) deploy at the deployment angle 160 with respect to the first blades 123 of the first propeller 106 (central propeller 202). In the example of FIG. 2B, the second blades 125 of the second propellers 108 (the central propeller 202 and the top propeller 204) deploy at the deployment angle 160 with respect to the first blades 123 of the first propeller 106 (the bottom propeller 206). Example deployment angles 160 include, but are not limited to, deployment angles 160 in a range of 30-80 degrees, e.g., 60 degrees.

FIG. 2A and FIG. 2B further illustrate a motor 210 operably coupled to the shaft 102 so as to drive or power rotation of the shaft 102 and the propeller assembly 100.

Fourth Example: Aircraft Including a Propeller Assembly

Figure 3A:
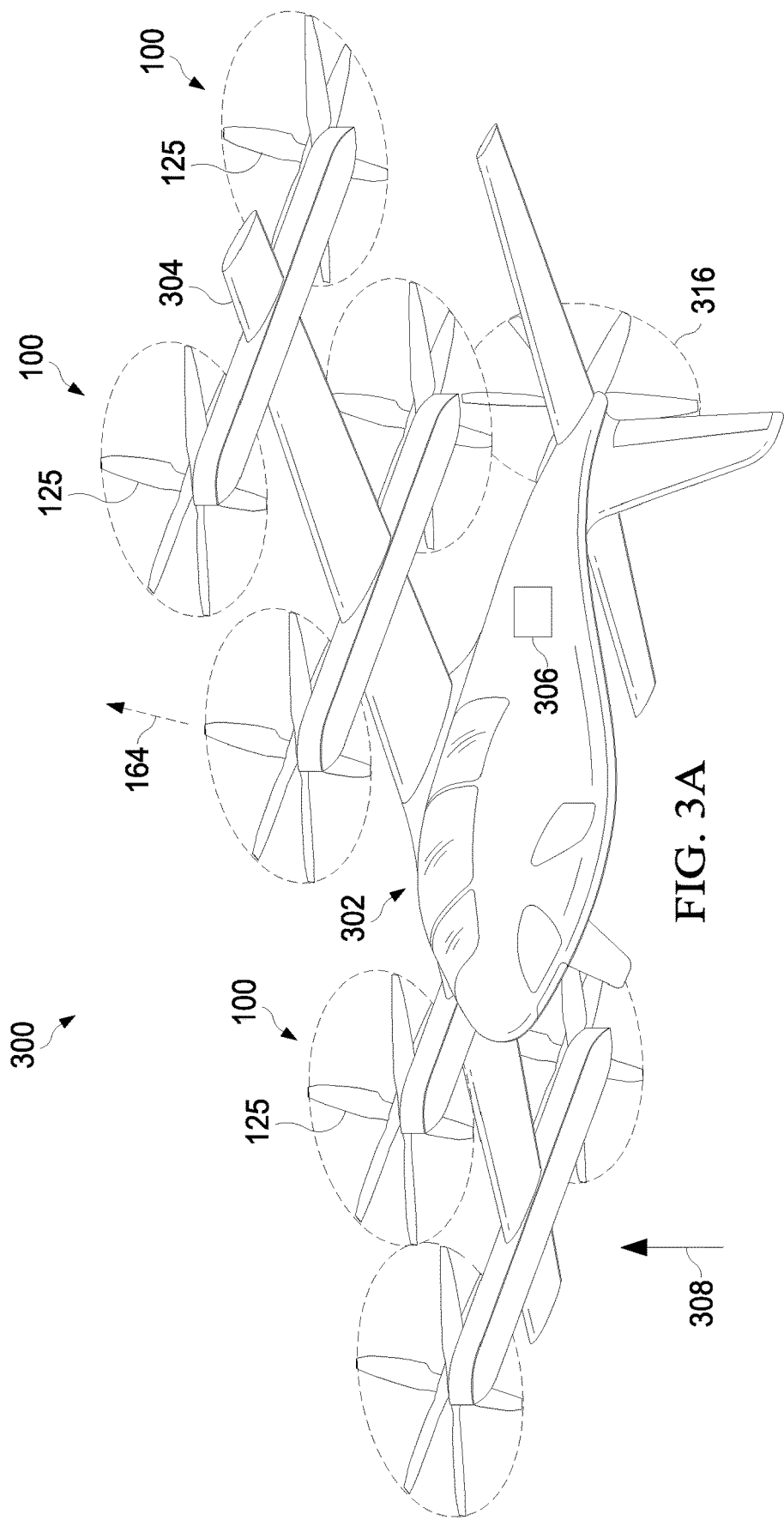
FIG. 3A illustrates an aircraft including a plurality of propeller assemblies according to examples described herein, wherein the propeller assemblies are un-folded in the deployed configuration for vertical take-off or landing.
Figure 3B:
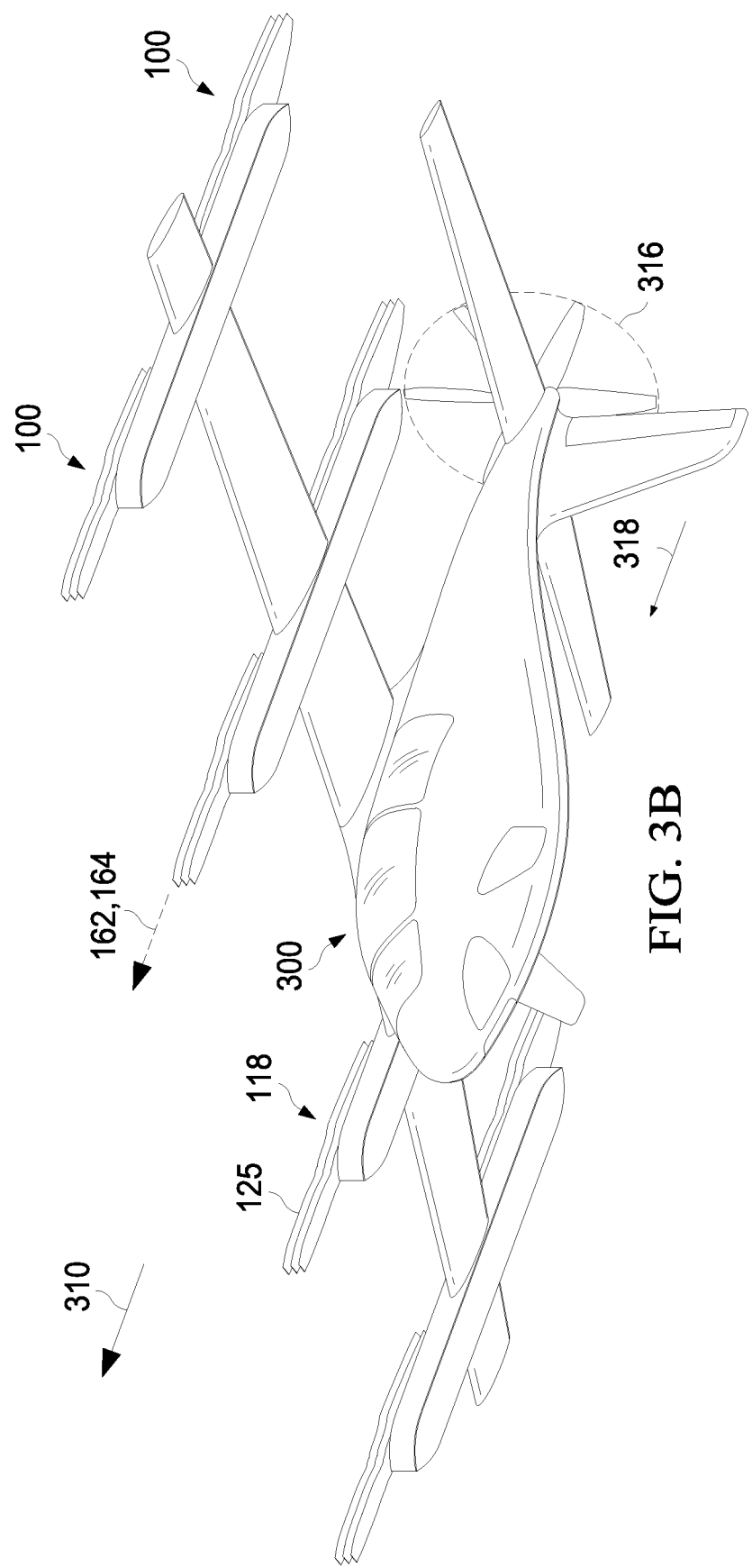
FIG. 3B illustrates the aircraft including the plurality of propeller assemblies of FIG. 3A, wherein the propeller assemblies are folded in a stowed configuration for cruising.

FIG. 3A and FIG. 3B illustrate an aircraft 300 comprising a fuselage 302; a wing 304 connected to the fuselage 302; and the propeller assembly 100 operatively connected to the wing 304. The aircraft 300 further includes a computer 306 coupled to the motor 210. FIG. 3A illustrates the computer 306 is configurable to command the motor 210 to rotate the shaft 102 with an angular velocity generating the centrifugal force 117 deploying the second propeller 108 into a deployed configuration 116a, so that the propeller assembly 100 generates a vertical thrust 308 during a vertical flight or take-off of the aircraft 300. FIG. 3B illustrates the computer 306 is further configurable to command the motor 210 to decrease the angular velocity so that the centrifugal force 117 is reduced below the bias force 119 of the spring 120 and the second propeller 108 returns to the stowed configuration 118 when the aircraft 300 is cruising or moving in a forward direction 310. FIG. 3B further illustrates an example wherein the first blades 123 and the second blades 125 in the stowed configuration 118 have their longitudinal axes (first longitudinal axis 162 and second longitudinal axis 164) substantially aligned along the forward direction 310 so as to reduce a drag of the propeller assembly 100 when the aircraft 300 is moving in the forward direction 310. As illustrated in FIG. 3, substantially aligned is defined as the first longitudinal axis 162, the second longitudinal axis 164, and the forward direction 310 being parallel or the first longitudinal axis 162 and/or the second longitudinal axis 164 being oriented at an angle within 5 degrees of the forward direction 310.

FIG. 3B further illustrates the aircraft 300 comprises an additional propulsor 316 operationally connected to the fuselage 302 for providing the aircraft 300 with the thrust comprising forward thrust 318 propelling the aircraft in the forward direction 310.

Fifth Example: Process Steps
Method of Making

Figure 4:
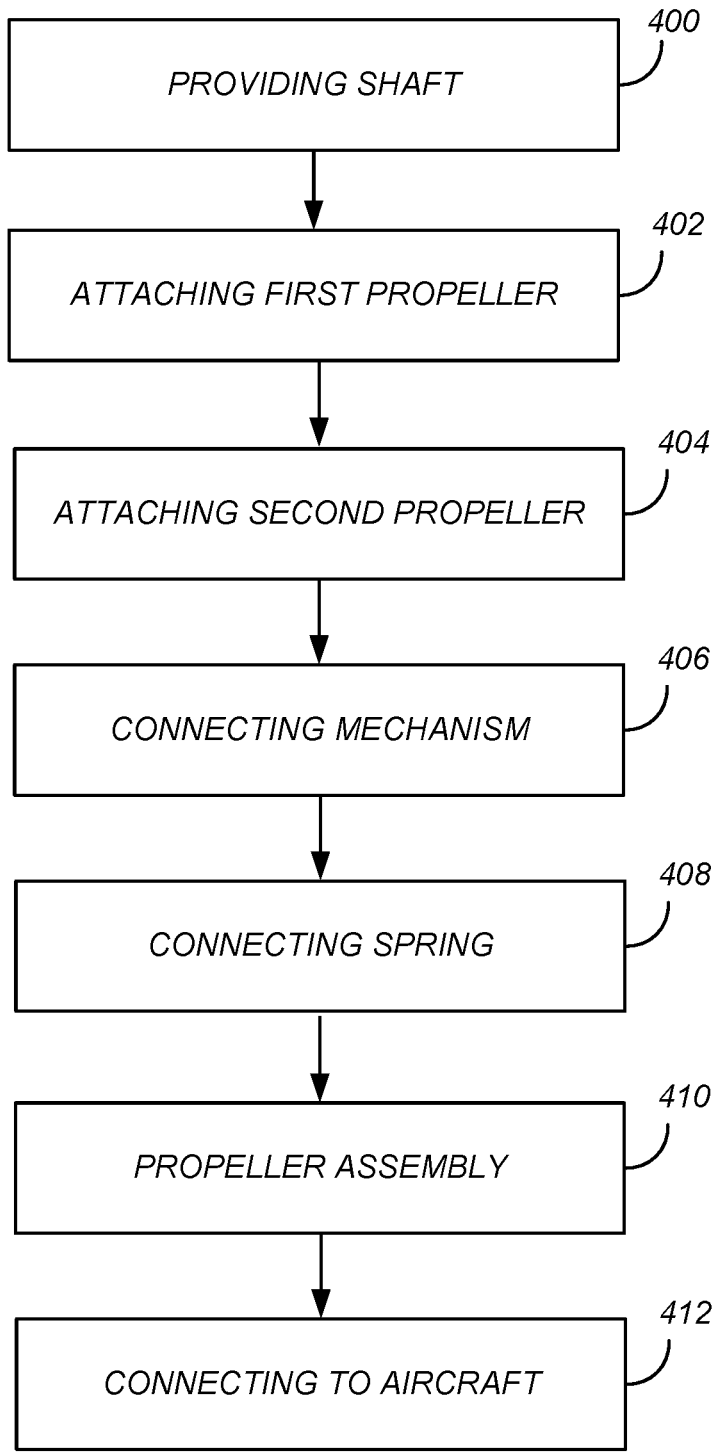
FIG. 4 is a flowchart illustrating a method of making a propeller assembly according to one or more examples described herein.

FIG. 4 is a flowchart illustrating a method of making a propeller assembly according to one or more examples (referring also to FIGS. 1A-1I, 2A-2B, 3A, and 3B)

Block 400 represents providing a shaft 102 having a rotational axis 104.

Block 402 represents coaxially attaching a first propeller 106 to the shaft 102 so that the first propeller is fixed to the shaft 102 and rotates in unison with the shaft 102.

Block 404 represents coaxially attaching a second propeller 108 to the shaft using a bearing 110 rotatably and coaxially connecting the second propeller 108 to the shaft 102, e.g., so that the second propeller 108 interacts with the first propeller 106 or the shaft 102 through the bearing 110 and can rotates freely and independently about the rotational axis 104 independently of the first propeller 106.

Block 406 represents connecting a mechanism 112 comprising a mass 114 to the first propeller 106 and the second propeller 108, the mechanism 112 configured to deploy 116 the second propeller 108 away from a stowed configuration 118 in response to a centrifugal force 117 acting on the mass 114 and generated by a rotation 104a of the shaft 102 about the rotational axis 104.

Block 408 represents connecting at least one spring 120 to the mechanism 112 and the first propeller 106 or the second propeller 108, the spring having a bias force 119 configured to bias the second propeller 108 in the stowed configuration 118.

Block 410 represents the end result, a propeller assembly 100. Illustrative, non-exclusive examples of inventive subject matter according to the present disclosure are described in the following enumerated paragraphs:

A1. A propeller assembly 100, comprising a shaft 102 having a rotational axis 104; a first propeller 106 coaxially connected to the shaft 102; a second propeller 108; a bearing 110 rotatably and coaxially connecting the second propeller 108 to the shaft 102; a mechanism 112 comprising a mass 114 connected to the first propeller 106 and the second propeller 108, the mechanism 112 configured to deploy 116 the second propeller 108 away from a stowed configuration 118 in response to a centrifugal force 117 acting on the mass 114 and generated by a rotation 104a of the shaft 102 about the rotational axis 104; and at least one spring 120 connecting the mechanism 112 to the first propeller 106 or the first propeller 106, the spring 120 having a bias force 119 configured to bias the second propeller 108 in the stowed configuration 118.

A2. The propeller assembly 100 of paragraph A1, wherein the first propeller 106 comprises a first hub 122 coaxially connected to the shaft; the second propeller comprises a second hub 124 and the bearing rotatably and coaxially connects the second hub 124 to the shaft, the mechanism 112 comprises a connector assembly 126 connecting the mass 114 to the first hub 122 and pivotally connecting the mass 114 to the second hub 124, so as to pivot the second hub 124 about the rotational axis 104 and deploy 116 the second propeller 108 in response to the centrifugal force 117.

A3. The propeller assembly of paragraph A1, wherein the mass 114 comprises a first mass 114a and a second mass 114b and the mechanism 112 comprises a connector assembly 126 including:

a first lever 128 connecting the first mass 114a to a first position 130 on the first hub 122 and a second lever 132 connecting the second mass 114b to a second position 134 on the first hub, the second position 134 diametrically opposed to the first position 130;

a third lever 136 connected at a third position 138 on the second hub 124 and the third lever 136 pivotably connected to the first lever 128, so that a first motion 140 of the first mass 114a in response to the centrifugal force 117 causes the first lever 128 to move the third lever 136 and the second hub 124; and a fourth lever 142 connected at a fourth position 144 on the second hub 124 diametrically opposed to the third position 138 and the fourth lever 142 pivotably connected to the second lever 132, so that a second motion 146 of the second mass 114b in response to the centrifugal force 117 causes the second lever 132 to move the fourth lever 142 and the second hub 124, in coordination with the first motion 140, to deploy the second propeller 108.

A4. The propeller assembly 100 of paragraph A3, wherein:

the third lever 136 is pivotably connected to the first lever 128 at a fifth position 148 between the first hub 122 and the first mass 114a, and the fourth lever 142 is pivotably connected to the second lever 132 at a sixth position 150 between the first hub 122 and the second mass 114b.

A5. The propeller assembly 100 of paragraph A3 or A4, wherein the at least one spring 120 comprises a first spring 120a connecting the first lever 128 to the first propeller 106 and a second spring 120b connecting the second lever 132 to the first propeller 106.

A6. The propeller assembly of any of the paragraphs A3-A5, wherein rotating, spooling up, or spinning the shaft 102 and the propeller assembly 100 generates the centripetal force forcing the first mass 114a and the second mass 114b outwards against the at least one spring 120, and the first lever 128 holding the first mass 114a and the second lever 132 holding the second mass 114b force, through the third lever 136 and fourth lever 142, respectively, the first propeller 106 and the second propeller 108 to unfold.

A7. The propeller assembly 100 of any of the paragraphs A3-A6, wherein rotating, spooling up, or spinning of the first propeller 106 generates the centrifugal force 117 moving the first mass 114a and the second mass 114b such that the first position 130, the third position 138, and the fifth position 148 are aligned, and the second position 134, the fourth position 144, and the sixth position 150 are aligned.

A8. The propeller assembly 100 of paragraph of any of the paragraphs A3-A7, further comprising a stop mechanism or the arrangement of the levers 128, 132, 136, 142 preventing the masses 114a, 114b from moving further in response to the centrifugal force 117 above a threshold level.

A9. The propeller assembly 100 of paragraphs A7 and A8, further comprising a stop mechanism rigidly fixing or rigidly connecting the first lever 128 and the third lever 136 when the first position 130, the third position 138, and the fifth position 148 are in alignment and rigidly fixing or rigidly connecting the second lever 132 and the fourth lever 142 when the second position 134, the fourth position 144, and the sixth position 150 are in alignment, thereby preventing any further movement of the second propeller 108 around the rotational axis 104 and locking the propeller assembly 100 in the deployed configuration 118.

A10. The propeller assembly 100 of any of the paragraphs A1-A9, further comprising a stop mechanism rigidly fixing the connector assembly 126, thereby locking the first propeller 106 and the second propeller 108 at a desired deployment angle 160.

A11. The propeller assembly 100 of any of the paragraphs A1-10, wherein the mechanism 112 directly connects the mass 114 to the shaft 102 so that the mechanism and the shaft are in physical contact.

A12. The propeller assembly 100 of any of the paragraphs A1-A11, wherein the mechanism 112 is configured so that the mass 114 swings against and with the rotation 104a of the shaft 102 about the rotational axis 104.

A13. The propeller assembly 100 of any of the paragraphs A1-A12, wherein the first propeller 106 and the second propeller 108 swing in opposite directions about the rotational axis 104 in response to the centrifugal force 117 deploying the second propeller 108.

A14. The propeller assembly 100 of any of the paragraphs A1-A13, further comprising the at least one spring 120 connected to a damping mechanism.

A15. The propeller assembly 100 of any of the paragraphs A1-A14, wherein the second propeller 108 is deployed in response to the centrifugal force overcoming the bias force 119.

A16. The propeller assembly 100 of paragraph A15 configured so that when the angular velocity of the shaft 102 drops below a certain threshold (e.g. less than 1000 revolutions per minute), the at least one spring 120 applies the biasing force that is greater than the centripetal force and pulls the second propeller 108 back into the stowed configuration 118.

A17. The propeller assembly 100 of any of the paragraphs A1-A16, wherein the first propeller 106 has a first propeller blades 123 having a first longitudinal axis 162, the second propeller 108 has second propeller blades 125 having a second longitudinal axis 164, the propeller blades 123, 125 in the stowed configuration having their longitudinal axes 162, 164 substantially aligned along the forward direction 310 so as to reduce a drag of the first propeller 106 and second propeller 108 when the aircraft 300 is moving in the forward direction 310.

A18. A propeller assembly 100 comprising: a shaft 102 having a rotational axis; a plurality of propellers 106, 108 connected to the shaft 102; means for deploying 190 the plurality of propellers (e.g., to an unfolded state) using a centrifugal force generated from a rotation 104a of the shaft 102, so as to provide vertical thrust 308 during a vertical take-off and landing of the aircraft 300; and means for restoring 192 the propellers 106, 108 into a stowed configuration 118 (e.g., folded state) when the centrifugal force is below a threshold level.

A19. The propeller assembly 100 of paragraph A18, wherein the means for deploying 190 comprises a mass 114 (or weight) that actuates the deployment of the propeller 108 by a centripetal force.

A20. The propeller assembly of paragraph A19, wherein the means for deploying 190 comprises the mechanism 112 of any of the paragraphs A1-A18.

A21. The propeller assembly of paragraphs A1-A20, wherein the means for deploying 190 or the mechanism 112 comprises a linkage, connector assembly 126, plurality of levers, arms, or connectors, connecting a mass 114 to the propellers 106, 108 and the means for restoring 192 comprises a spring 120, connecting the mass 114 to one of the propellers 106, the spring 120 biasing the propellers 108 to the stowed configuration 118 when the angular velocity (e.g., revolutions per minute) falls below a threshold level.

A22. The propeller assembly 100 of paragraph A21, wherein mass 114 actuates two levers comprising a primary arm 170 and a secondary arm 176, wherein the primary arm 170 connects the mass 114 and the shaft 102 and the secondary arm 176 connects the primary arm 170 with one of the propellers 108.

A23. The propeller assembly 100 of any of the paragraphs A1-A21, wherein the connector assembly 126 comprises a first member and a second member each comprising a lever, a connector, or an arm, wherein the mass 114 is fixed to the first member at a certain position, and the members are fixed at one end to each other and at the other end to the first propeller 106 and the second propeller 108, respectively.

A24. The propeller assembly 100 of any of the paragraphs A1-A23, wherein the deployed configuration comprises the propellers in an open or unfolded state and the stowed configuration comprises the propellers in a folded or closed state.

Block 412 represents optionally mounting one or more propeller assemblies 100 on an aircraft 300.

A25. An aircraft 300 comprising the propeller assembly 100 of any of the paragraphs A1-23, comprising:
 a fuselage 302;
 the propeller assembly 100 operatively connected to the fuselage 302;
 a motor 210 connected to the shaft 102 to rotate the shaft 102; and
 a computer 306 coupled to the motor 210, wherein the computer 306 is configurable to command the motor 210 to:
 rotate the shaft 102 with an angular velocity generating the centrifugal force deploying the second propeller 108 into a deployed configuration 116*a*, so that the propeller assembly 100 generates a vertical thrust 308 during a vertical flight of the aircraft 300, and
 decrease the angular velocity so that the centrifugal force is reduced below the bias force 119 so that the second propeller 108 returns to the stowed configuration 118 when the aircraft 300 is cruising or moving in a forward direction 310.

A26. The aircraft of paragraph A25, further comprising an additional propulsor 316 operationally connected to the fuselage 302 for providing the aircraft with the thrust comprising forward thrust 318.

Method of Operating

Figure 5:
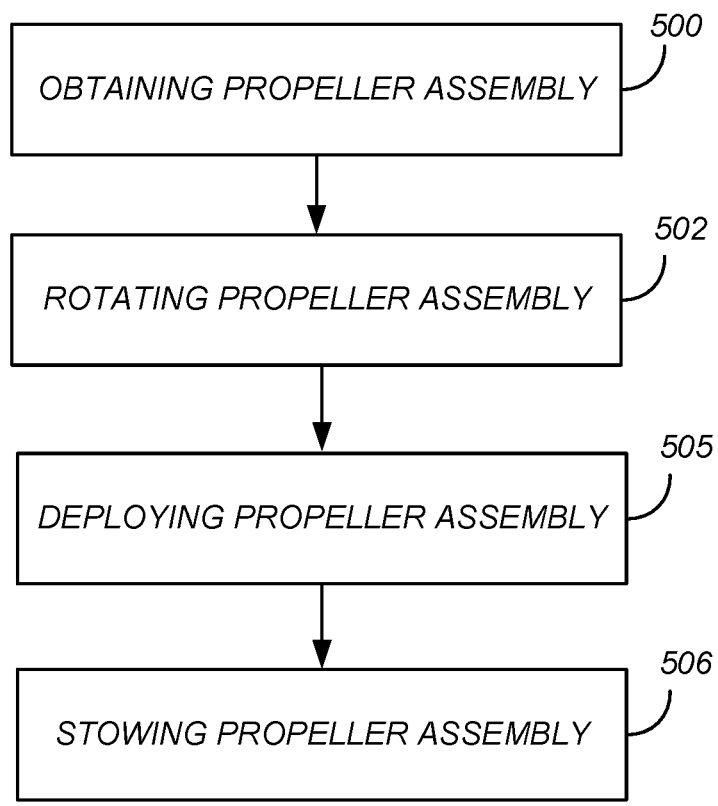
FIG. 5 is a flowchart illustrating a method of operating the propeller assembly according to one or more examples described herein.

FIG. 5 represents a method of controlling thrust.

Block 502 represents obtaining or providing a propeller assembly as described herein including any of the paragraphs A1-A26.

Block 502 represents rotating, spooling up, or spinning the propeller assembly 100 at an angular velocity to generate the centrifugal force used to deploy 504 the propeller assembly. In one example, the angular velocity generates the centrifugal force that exceeds the bias force 119 needed to retract the propeller assembly 100 into the stowed configuration 118. In one example, the angular velocity is more than 1000 revolutions per minute.

Block 506 represents retracting or stowing the second propeller into the stowed configuration. The step comprises reducing or decreasing the angular velocity so that the centrifugal force is reduced below the bias force 119 so that the second propeller 108 automatically returns to the stowed configuration 118 when the aircraft is cruising or moving in a forward direction 310. In one or more examples, the retracting comprises stopping the rotating so that the bias force 119 biases the second propeller in the stowed configuration including the first longitudinal axis and the second longitudinal axis substantially aligned along a forward direction so as to reduce a drag of the first propeller and the second propeller when the aircraft is moving in the forward direction.

Processing Environment

Figure 6:
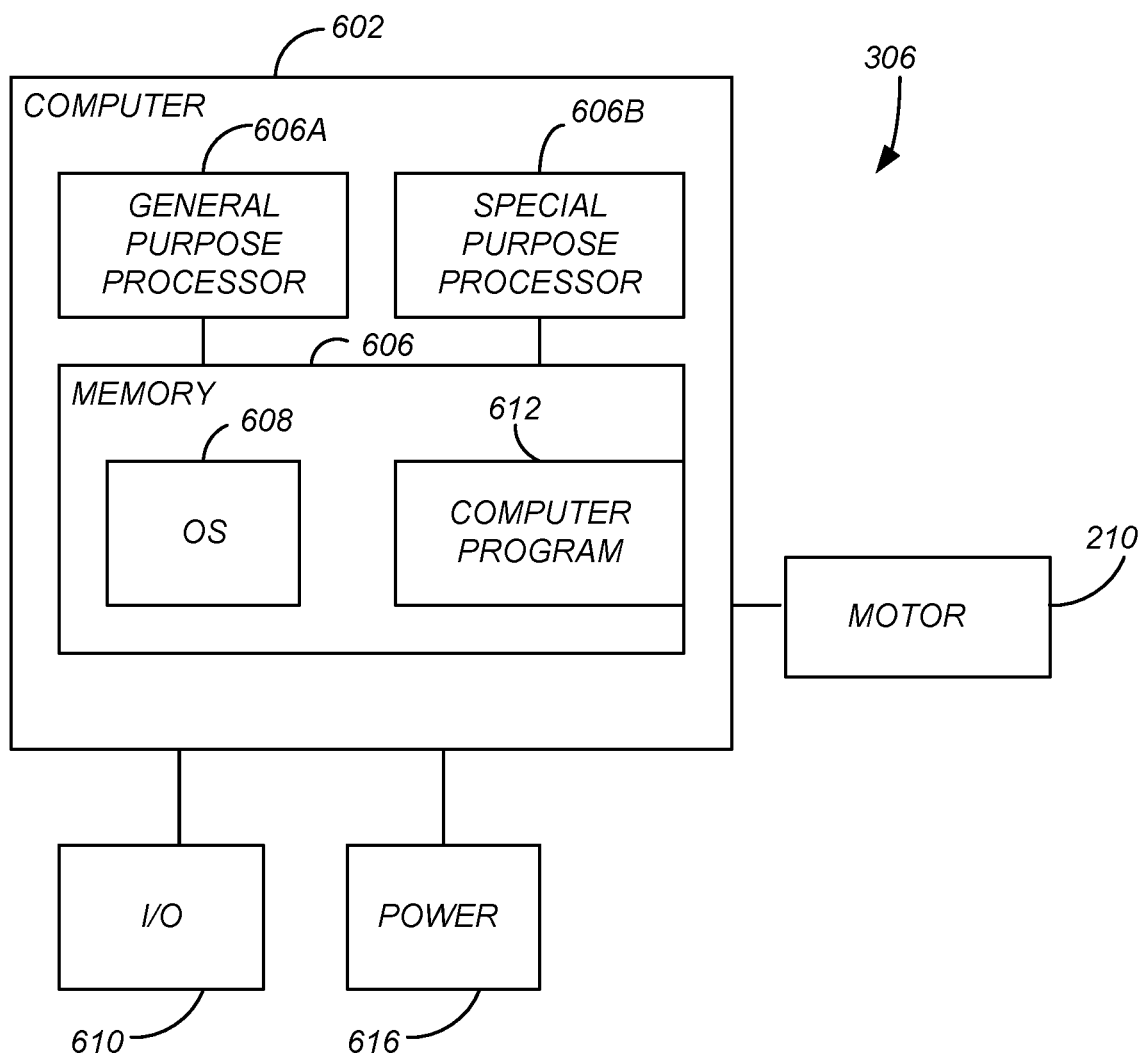
FIG. 6 illustrates a hardware environment for controlling the propeller assembly according to examples described herein.

FIG. 6 illustrates an exemplary system 600 used to implement processing elements needed to control the propeller assembly 100. In other examples, the system 600 is a flight control system used to control deployment and retraction of the propeller assembly as described herein.

The computer 602, 306 comprises a processor 604 (general purpose processor 606A and special purpose processor 606B) and a memory 606, such as random access memory (RAM). Generally, the computer 602 operates under control of an operating system 608 stored in the memory 606, and interfaces with the user/other computers to accept inputs and commands (e.g., analog or digital signals from the crew or flight control system) and to present results through an input/output (I/O) module 610. The computer program application 612 accesses and manipulates data stored in the memory 806 of the computer 602. The operating system 608 and the computer program 612 are comprised of instructions which, when read and executed by the computer 602, cause the computer 602, 306 to perform the operations and/or methods herein described, controlling the motor 210 to control angular velocity of the shaft 102 and thereby opening/deploying and closing/stowing of the propeller assembly 100. In one embodiment, instructions implementing the operating system 608 and the computer program 612 are tangibly embodied in the memory 606, thereby making one or more computer program products or articles of manufacture capable of controlling the propeller assembly as described herein. As such, the terms "article of manufacture," "program storage device" and "computer program product" as used herein are intended to encompass a computer program accessible from any computer readable device or media. Also shown is a source of power 616 for the computer.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the examples of the present disclosure. The foregoing description of the examples has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A propeller assembly, comprising:
    a shaft having a rotational axis;
    a first propeller coaxially connected to the shaft;
    a second propeller;
    a bearing rotatably and coaxially connecting the second propeller to the shaft;
    a mechanism comprising a mass connected to the first propeller and the second propeller, the mechanism configured to deploy the second propeller away from a stowed configuration in response to a centrifugal force acting on the mass and generated by a rotation of the shaft about the rotational axis; and
    at least one spring connecting the mechanism to the first propeller or the second propeller, the spring having a bias force configured to bias the second propeller in the stowed configuration.

2. The propeller assembly of claim 1, wherein:
    the first propeller comprises a first hub coaxially connected to the shaft;
    the second propeller comprises a second hub and the bearing rotatably and coaxially connects the second hub to the shaft, and
    the mechanism comprises a connector assembly connecting the mass to the first hub and pivotally connecting the mass to the second hub, so as to pivot the second hub about the rotational axis and deploy the second propeller in response to the centrifugal force.

3. The propeller assembly of claim 2, wherein the mass comprises a first mass and a second mass and the mechanism comprises the connector assembly including:
    a first lever connecting the first mass to a first position on the first hub and a second lever connecting the second mass to a second position on the first hub, the second position diametrically opposed to the first position;
    a third lever connected at a third position on the second hub and the third lever pivotally connected to the first lever, so that a first motion of the first mass in response to the centrifugal force causes the first lever to move the third lever and the second hub; and
    a fourth lever connected at a fourth position on the second hub diametrically opposed to the third position and the fourth lever pivotally connected to the second lever, so that a second motion of the second mass in response to the centrifugal force causes the second lever to move the fourth lever and the second hub, in coordination with the first motion, to deploy the second propeller.

4. The propeller assembly of claim 3, wherein:
    the third lever is pivotally connected to the first lever at a fifth position between the first hub and the first mass, and
    the fourth lever is pivotally connected to the second lever at a sixth position between the first hub and the second mass.

5. The propeller assembly of claim 3, wherein the at least one spring comprises a first spring connecting the first lever to the first propeller and a second spring connecting the second lever to the first propeller.

6. The propeller assembly of claim 1, wherein the second propeller is deployed in response to the centrifugal force overcoming the bias force.

7. An aircraft comprising the propeller assembly of claim 1, further comprising:
    a fuselage;
    the propeller assembly operatively connected to the fuselage;
    a motor connected to the shaft to rotate the shaft; and
    a computer coupled to the motor, wherein the computer is configurable to command the motor to:
    rotate the shaft with an angular velocity generating the centrifugal force deploying the second propeller into a deployed configuration, so that the propeller assembly generates a thrust during a vertical flight of the aircraft, and
    decrease the angular velocity so that the centrifugal force is reduced below the bias force so that the second propeller returns to the stowed configuration when the aircraft is cruising or moving in a forward direction.

8. The aircraft of claim 7, wherein:
    the first propeller comprises first propeller blades having a first longitudinal axis and the second propeller comprises second propeller blades having a second longitudinal axis, and
    the first longitudinal axis and the second longitudinal axis in the stowed configuration are substantially aligned along the forward direction so as to reduce a drag of the first propeller and the second propeller when the aircraft is moving in the forward direction.

9. The aircraft of claim 7, further comprising an additional propulsor operationally connected to the fuselage for providing the aircraft with the thrust comprising forward thrust.

10. A method of controlling a propeller assembly, comprising:
    controlling a propeller assembly wherein the propeller assembly includes:
    a shaft having a rotational axis;
    a first propeller coaxially connected to the shaft;
    a second propeller;
    a bearing rotatably and coaxially connecting the second propeller to the shaft;
    a mechanism comprising a mass connected to the first propeller and the second propeller, the mechanism configured to deploy the second propeller away from a stowed configuration in response to a centrifugal force acting on the mass and generated by a rotation of the shaft about the rotational axis; and
    at least one spring connecting the mechanism to the first propeller or the second propeller, the spring having a bias force configured to bias the second propeller in the stowed configuration; and
    deploying the second propeller away from the stowed configuration, comprising rotating the shaft at an angular velocity to generate the centrifugal force that exceeds the bias force.

11. The method of claim 10, wherein the deploying comprises rotating the shaft at the angular velocity of more than 1000 revolutions per minute.

12. The method of claim 10, wherein:
    the first propeller comprises a first hub coaxially connected to the shaft;
    the second propeller comprises a second hub and the bearing rotatably and coaxially connects the second hub to the shaft,
    the mechanism comprises a connector assembly connecting the mass to the first hub and pivotally connecting the mass to the second hub, so as to pivot the second hub about the rotational axis and deploy the second propeller in response to the centrifugal force.

13. The method of claim 12, wherein
wherein the mass comprises a first mass and a second mass and the mechanism comprises the connector assembly including:
a first lever connecting the first mass to a first position on the first hub and a second lever connecting the second mass to a second position on the first hub, the second position diametrically opposed to the first position;
a third lever connected at a third position on the second hub and the third lever pivotably connected to the first lever, so that a first motion of the first mass in response to the centrifugal force causes the first lever to move the third lever and the second hub; and
a fourth lever connected at a fourth position on the second hub diametrically opposed to the third position and the fourth lever pivotably connected to the second lever, so that a second motion of the second mass in response to the centrifugal force causes the second lever to move the fourth lever and the second hub, in coordination with the first motion, to deploy the second propeller.

14. The method of claim 13, wherein:
the third lever is pivotally connected to the first lever at a fifth position between the first hub and the first mass, and
the fourth lever is pivotably connected to the second lever at a sixth position between the first hub and the second mass.

15. The method of claim 14, wherein the at least one spring comprises a first spring connecting the first lever to the first propeller and a second spring connecting the second lever to the first propeller.

16. The method of claim 10, further comprising retracting the second propeller into the stowed configuration, comprising reducing the angular velocity so that the bias force exceeds the centrifugal force.

17. The method of claim 16, wherein:
the first propeller comprises first propeller blades having a first longitudinal axis and the second propeller comprises second propeller blades having a second longitudinal axis, and
the retracting comprises stopping the rotating so that the bias force biases the second propeller in the stowed configuration including the first longitudinal axis and the second longitudinal axis substantially aligned along a forward direction so as to reduce a drag of the first propeller and the second propeller when an aircraft comprising the propeller assembly is moving in the forward direction.

18. The method of claim 17, further comprising operationally connecting an additional propulsor to the aircraft for providing the aircraft with a thrust in the forward direction.

19. An aircraft comprising a propeller assembly, the propeller assembly comprising:
a shaft having a rotational axis;
a plurality of propellers connected to the shaft, wherein the propellers comprise a first propeller and a second propeller;
a mass connected to the first propeller and the second propeller so that the second propeller is deployed away from a stowed configuration in response to a centrifugal force acting on the mass and generated by a rotation of the shaft about the rotational axis; and
means for restoring the propellers into the stowed configuration when the centrifugal force is below a threshold level.

20. The propeller assembly of claim 19, further comprising a plurality of levers connecting the mass to the propellers and the means for restoring comprising a spring connecting the mass to one of the propellers.

* * * * *